United States Patent
Dunn et al.

(10) Patent No.: US 6,366,758 B1
(45) Date of Patent: *Apr. 2, 2002

(54) MUSICAL CUBE

(75) Inventors: Steven Bryan Dunn, Beverly Hills; Norman Weinberger, Corona del Mar, both of CA (US)

(73) Assignee: Munchkin, Inc., Van Nuys, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/421,730

(22) Filed: Oct. 20, 1999

(51) Int. Cl.[7] .......................... G09B 5/04; G09B 15/00; G09B 15/02
(52) U.S. Cl. ..................... 434/319; 84/470 R; 84/476
(58) Field of Search ............................. 434/319, 171; 84/470 R, 600, 601, 602, 634, 653, 678, DIG. 7, 476

(56) References Cited

U.S. PATENT DOCUMENTS

| | | | | |
|---|---|---|---|---|
| 491,833 A | * | 2/1893 | Bowen et al. ................ 84/476 |
| 4,121,488 A | | 10/1978 | Akiyama ..................... 84/1.01 |
| 4,140,039 A | | 2/1979 | Faulkner ..................... 84/1.03 |
| 4,294,155 A | * | 10/1981 | Turner ........................ 84/682 |
| 4,339,978 A | | 7/1982 | Imamura ..................... 84/1.03 |
| 4,651,613 A | * | 3/1987 | Harrison ........................ 84/95 |
| 4,662,260 A | | 5/1987 | Rumsey ...................... 84/1.01 |
| 4,836,075 A | * | 6/1989 | Armstrong ................... 84/1.01 |
| 4,936,780 A | | 6/1990 | Cogliano .................... 434/311 |
| 4,974,486 A | * | 12/1990 | Wallace ........................ 84/609 |
| 4,981,457 A | * | 1/1991 | Iimura et al. ............... 446/408 |
| 5,049,107 A | | 9/1991 | DeNittis ..................... 446/397 |
| 5,058,894 A | | 10/1991 | Levinn et al. ........... 273/153 R |
| 5,074,182 A | * | 12/1991 | Capps et al. .................. 84/609 |
| 5,145,447 A | | 9/1992 | Goldfarb .................... 446/408 |
| 5,179,240 A | * | 1/1993 | Mizuno et al. ................ 84/613 |
| 5,260,512 A | | 11/1993 | Chomette et al. ............. 84/644 |
| 5,393,926 A | * | 2/1995 | Johnson ....................... 84/610 |
| 5,461,188 A | * | 10/1995 | Drago et al. .................. 84/600 |
| 5,488,196 A | * | 1/1996 | Zimmerman et al. ......... 84/612 |
| 5,563,359 A | | 10/1996 | Okamura ..................... 84/600 |
| 5,784,733 A | | 7/1998 | Rasamny et al. ............. 5/482 |
| 5,841,051 A | * | 11/1998 | Segan ...................... 84/477 R |
| 5,949,010 A | * | 9/1999 | Hacker ........................ 84/476 |
| 6,271,453 B1 | * | 7/2001 | Hacker ........................ 84/476 |

OTHER PUBLICATIONS

Photocopy of Front Surface of "The Sisney Music & Lights Parade," sold by Mattel Corp., sirca 1993.

* cited by examiner

Primary Examiner—John Edmund Rovnak
(74) Attorney, Agent, or Firm—Knoble & Yoshida, LLC (57) ABSTRACT

An apparatus for facilitating an understanding and recognition of polyphonic and orchestral music in infants and small children includes a housing, a speaker within the housing, a plurality of input devices such as buttons positioned on the housing; and a music generator within for storing and playing at least one prearranged multi-channel musical composition that is constructed and arranged to be able to, in response to actuation of at least one of the input devices by a user, change the identity of channels of the multi-channel composition that are being played over the speaker without interrupting the musical composition as it plays. The apparatus is used in a process that permits an infant or small child to experience complex, polyphonic music from a quality source in a way that maximizes the child's opportunity to learn from and develop in response to the music. It further permits the infant or small child to experiment or improvise with respect to the music, but not in a discordant way, only in a way that will enhance the learning and development process. This entire experience will be afforded to the infant or small child in an apparatus that is visually attractive and safe, so that it may be used even when a parent or caregiver is not closely watching.

63 Claims, 4 Drawing Sheets

MUSICAL CUBE

BACKGROUND OF THE INVENTION

1. Field of the Invention

This invention relates generally to the field of tools and techniques for enhancing early childhood development. More specifically, the invention relates to systems and processes that permit an infant or small child to experience complex, polyphonic music such as ensemble music from a quality source in a way that maximizes the child's opportunity to learn from and develop in response to the music, and further gives the infant or small child an opportunity to experiment or improvise with respect to the music, but only in such a way that will enhance the learning and neurological development process.

2. Description of the Related Technology

It has now been established that human infants are born with the ability to process and understand basic musical material. For example, their ability to discriminate two notes is as good as that of adults (Olisho, 1984), they can remember the contour (pattern of rising and falling pitches) of melodies (Trehub, Bull and Thorpe, 1984), they mentally segment (or "chunk") extended melodies into smaller phrases as do adults (Thorpe and Trehub, 1989) and they comprehend rhythm (Trehub and Thorpe, 1989). They even can use music as an aid to remember previous daily events, and also exhibit an innate preference for musical sounds that are consonant rather than dissonant (Fagen et al., 1997). These findings show that children have the capacity to process and remember music and thereby to be influenced by music starting at a very early age.

In recent years, experts in childhood development, neurology and related fields have shown that music can have a significant positive impact on intellectual development. Exposure to music has been linked to improvements in learning to read and engage in mathematical and symbolic thinking, such as involved in solving spatial-temporal tasks like mental arrangement of puzzle pieces.

In a study conducted at the University of California Irvine, Rauscher and Shaw (1997) studied the effects of active participation in piano keyboard lessons on cognitive abilities. Over a two-year period, a numbers of preschoolers were split into a first group that was given piano lessons, a second group that was given singing lessons, a third group that was given computer lessons and a fourth group that were not given lessons of any kind. The four groups were then tested on their ability to a arrange pieces of a puzzle into a meaningful whole. The researchers found that the children who received keyboard lessons showed a significant increase in their ability to solve the visual-spatial tasks compared to each of the other groups.

Evidence of the connection between early exposure to certain types of music and enhanced intellectual development is also provided by the experiences that parents and researchers have had with the Kodály musical education program, which was developed in Hungary and provides a structured approach to musical training in early childhood. The effect of this training on later academic development was studied by Hurwitz et al. (1975) at Children's Hospital in Boston. With all other factors being equal, this study found a dramatic increase in reading scores between children who had been in the Kodály program versus those who had not.

The process of brain development starts with the genes that the child has inherited from her parents. These genes determine the basic number of neurons that are present in the brain and the structure of the major neural pathways. Experience, however, shapes the interconnections that are developed between the neurons as the child grows and learns. Research by Weinberger at the University of California Irvine (1990–1998) has shown that musical sounds (tones) which attract attention can result in a "retuning" of brain cells (neurons) in the auditory cortex, which is the highest level of the auditory system and a region involved both in understanding language and music. Thus, interaction with musical sounds can enhance the ability of the brain to process, discriminate and remember sounds. These changes are likely to have a positive effect on a child's ability to understand spoken words and build an advanced vocabulary.

The basis of music's positive effects on reading has been explained by the work of Lamb and Gregory (1993). Learning to read requires sounding-out syllables which is based on learning to discriminate pitches in phonetic materials. Learning to read was closely identified with the fact that practice with listening to music improves pitch discrimination.

As more has been learned about the relationship of music to cognitive ability, parents have been making a greater effort to expose their children to music. Certain types of toys, such as small keyboard instruments that permit a child to play individual synthesized notes and that may also feature prerecorded synthesized tunes or a selection of percussive accompaniment are helpful to some extent because the child is given the opportunity to experiment and improvise. These types of toys, though, tend to lack quality acoustics and give little or no opportunity for the child to learn and understand the fundamental aspects of group or orchestral music, which concern how various types of instruments (strings, brass, woodwinds, percussion) interrelate to provide melody and harmony.

A need exists for a system, technique and method that permits a child to learn and recognize the different sounds made by individual instruments and the various sounds and combinations that two or more instruments make playing together.

SUMMARY OF THE INVENTION

Accordingly, it is an object of the invention to provide a system, technique and method that permits a child to learn and recognize the different sounds made by individual instruments and the various sounds and combinations that two or more instruments can make playing together.

In order to achieve the above and other objects of the invention, an apparatus for facilitating an understanding and recognition of polyphonic music in infants and small children includes, according to a first aspect of the invention, a housing; a speaker positioned within the housing; a plurality of input devices positioned on the housing; and a music generator within the housing for storing and playing at least one prearranged multi-channel musical composition, the music generator being electronically connected to the speaker and the input devices, and wherein the music generator is constructed and arranged to be able to, in response to actuation of at least one of the input devices by a user, change the identity of channels of the multi-channel composition that are being played over the speaker, and wherein the change in channels is effected without interrupting the musical composition as it plays.

A method for teaching musical concepts to infants and small children according to a second aspect of the invention includes steps of providing a child-friendly apparatus that is capable of playing an orchestral composition that includes a plurality of different musical instruments; actuating the apparatus to play the composition; and modifying the number and of instruments that are playing as the composition plays, whereby the infant or small child is made aware of the effect of the presence or absence of different instruments in the overall composition.

According to a third aspect of the invention, a method for teaching musical concepts to infants and small children includes steps of providing a child-friendly apparatus that is capable of playing an orchestral composition that includes a plurality of different musical instruments; playing a developmentally appropriate composition with the apparatus; and modifying the number of instruments that are playing as the composition plays, whereby the infant or small child is made aware of the effect of the presence or absence of different instruments in the overall composition.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
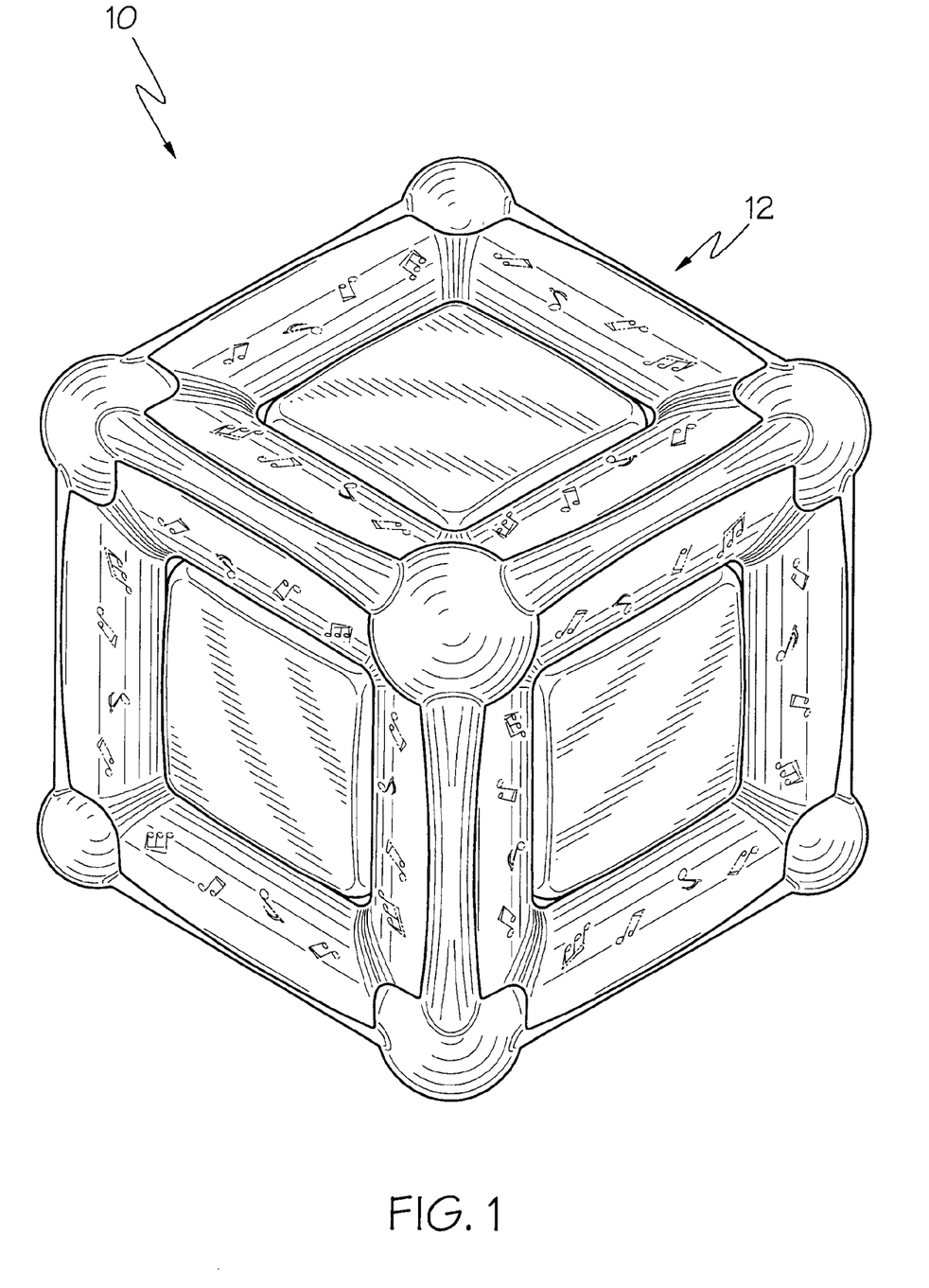
FIG. 1 is a perspective view of an apparatus that is constructed according to a preferred embodiment of the invention.

Referring now to the drawings, wherein like reference numerals designate corresponding structure throughout the views, and referring in particular to FIG. 1, an apparatus 10 for facilitating an understanding and recognition of polyphonic music such as ensemble music in infants and small children is in general terms constructed as a polyhedron, and more specifically a cube that is fabricated without sharp edges so that it is safe for infants and small children to possess. As may be seen in FIG. 1, apparatus 10 includes raised, soft rubber edges and rounded corners. Alternatively, apparatus 10 could be fabricated as another type of polyhedron, a sphere, or a flat panel. As will readily be appreciated based on the following description, apparatus 10 is sized and shaped so that it can be handled and lifted by an infant or small child. In addition, as will be evident from the following description and the drawings, apparatus 10 does not include a keyboard, which may be defined as a surface or unit having number of keys that permit entry of individual sounds such as notes or chords.

Figure 2:
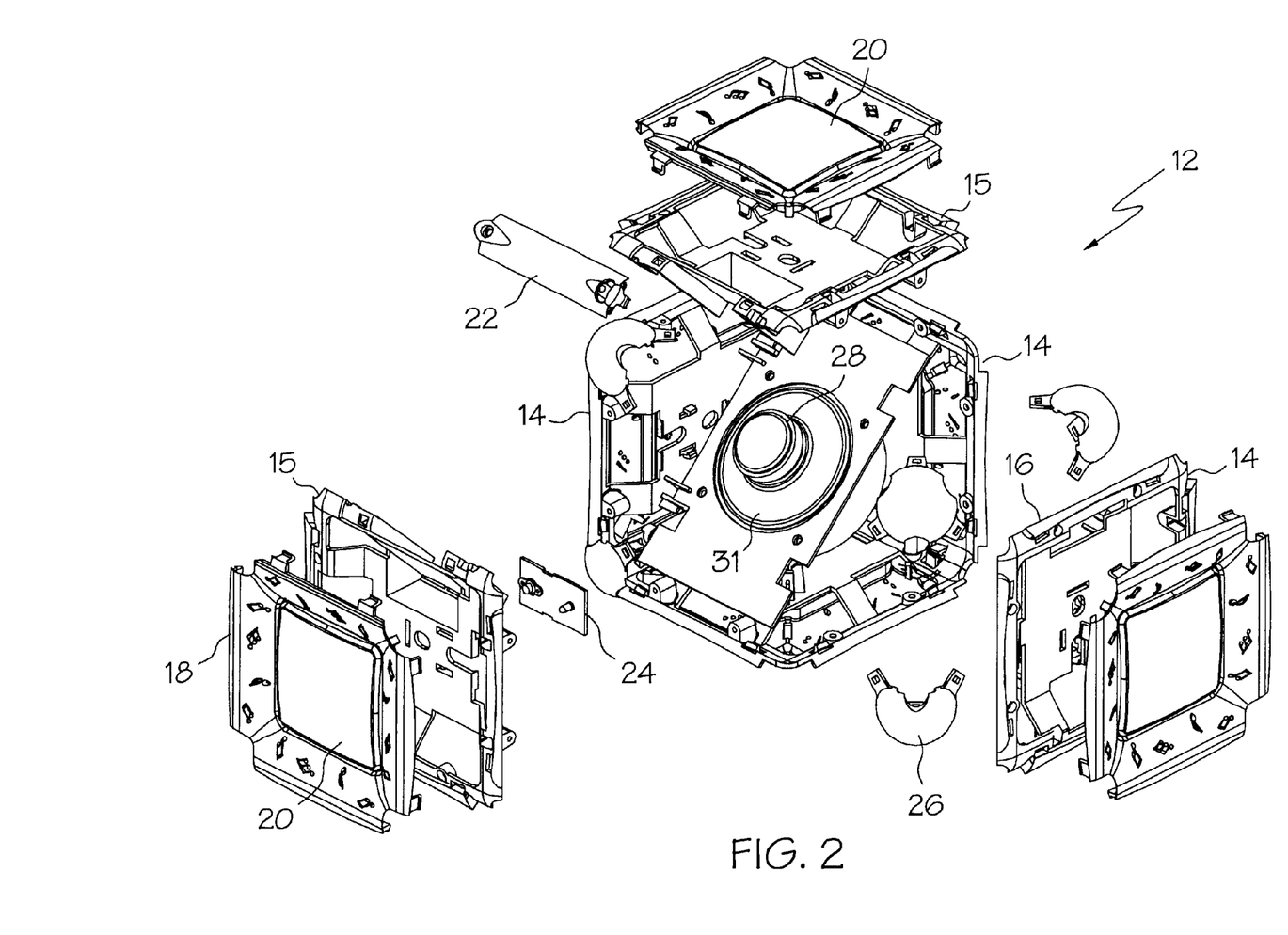
FIG. 2 is an exploded view of the apparatus that is shown in FIG. 1.

Looking now to FIGS. 1 and 2, it will be seen that the apparatus 10 includes a housing 12 that includes four identical square-shaped interior frame components 14 and two other components 15 that are secured together to form the framework of a cube. The four identical components 14 are fastened together with screws for rigidity, and each frame element has bosses thereon that retain the printed circuit board 29 (discussed below) diagonally with respect to the cube-shaped body of the apparatus 12. The two additional components define a battery compartment, and together with the four identical components define the cube-like shape of the apparatus 12. Each interior frame component 14 includes a plurality of molded plastic edge guards 16, which cooperate with eight soft molded rubber corner pieces 26 to form a near continuous rounded border about the edges and corners of the apparatus 10. The rounded edges and corners prevent injury to the child and protect the apparatus' electronic internal components from shock if it should be dropped.

Figure 4:
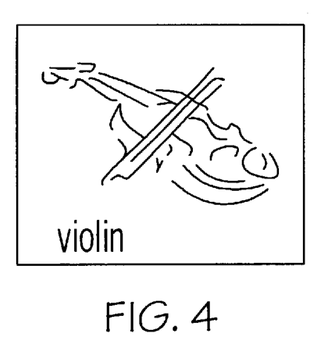
FIG. 4 is an isolation view of a graphic that is provided on one component of apparatus that is constructed according to the preferred embodiment of the invention.
Figure 5:
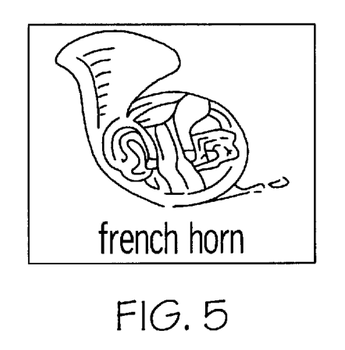
FIG. 5 is an isolation view of a graphic that is provided on another component of apparatus that is constructed according to the preferred embodiment of the invention.
Figure 6:
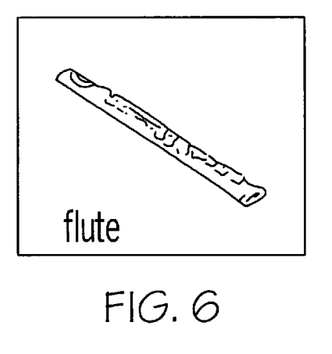
FIG. 6 is an isolation view of a graphic that is provided on another component of apparatus that is constructed according to the preferred embodiment of the invention.
Figure 7:
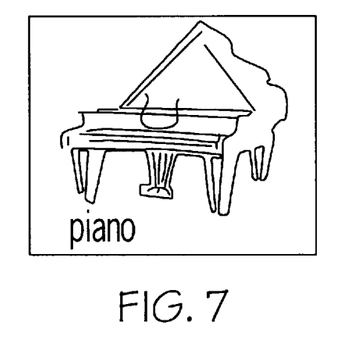
FIG. 7 is an isolation view of a graphic that is provided on another component of apparatus that is constructed according to the preferred embodiment of the invention.
Figure 8:
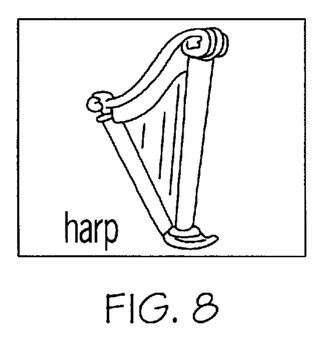
FIG. 8 is an isolation view of a graphic that is provided on another component of apparatus that is constructed according to the preferred embodiment of the invention.
Figure 9:
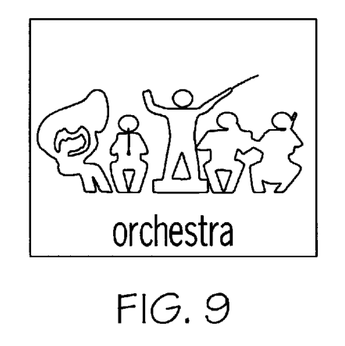
FIG. 9 is an isolation view of a graphic that is provided on yet another component of apparatus that is constructed according to the preferred embodiment of the invention.

As may further be seen in FIG. 2, six fascia pieces 18 are secured over the respective outer surfaces of the interior frame components 14 and each fascia piece 18 acts to secure a large button 20 in position between the fascia piece 18 and the interior frame component 14. The buttons 20 are preferably hinged and include colored graphics thereon that in the preferred embodiment depict a musical instrument, or an orchestra or ensemble of instruments. In the most preferred embodiment of the invention, the graphics respectively depict a violin, which is depicted in FIG. 4, a French horn, as is shown in FIG. 5, a piano, as is shown in FIG. 6, a flute, as is shown in FIG. 7, a harp, as is depicted in FIG. 8, and an orchestra, which is shown in FIG. 9 as a collage of different instruments. Buttons 20 are preferably large enough to be effectively manipulated by infants and young children who are still developing dexterity and hand-eye coordination. Preferably the buttons 20 have a surface area that is at least 4 cm$^2$, with a more preferred surface area of at least 9 cm$^2$. In the most preferred embodiment, the buttons 20 are generally square in shape, and have a surface area of about 36 cm$^2$.

Six light sources 34, such as a light bulbs or LEDs, are also preferably associated with the respective buttons 20, for purposes that will be described in greater detail below.

Two of the interior frame components 14 have a void in place of one of the edge guards 16, and in this space is provided a door 22 that is removable by the consumer to gain access to a battery compartment and battery contacts 24.

Figure 3:
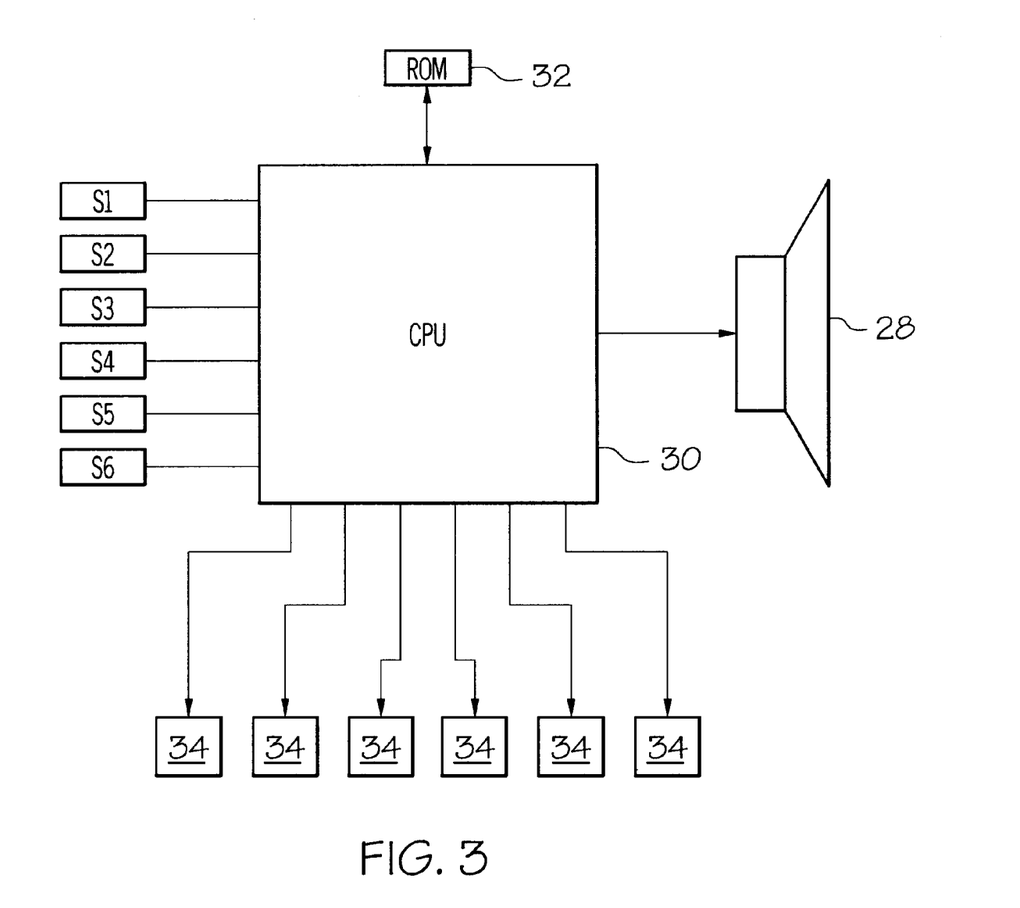
FIG. 3 is a schematic diagram depicting a control system for the apparatus shown in FIGS. 1 and 2.

Also provided within the housing 12 is a high-quality speaker 28, which is shown schematically in FIG. 3. According to one important aspect of the invention, the interior shaped of the housing 12 has been designed in such as manner as to acoustically guide sound from the speaker 28 to the space outside of the housing 12 as accurately as possible without echoes, uneven frequency attenuation or other distortion. In the preferred embodiment, as is best shown in FIG. 2, the speaker 28 is attached directly to a printed circuit board 29 by a resonance tube or baffle 31 whose dimensions and shape are designed to enhance the low frequency response of the speaker 28 and the overall acoustics of the sound output. The speaker, baffle, and printed circuit board assembly is placed diagonally inside the apparatus 12 so as to allow the sound waves to bounce off the inner walls of the cube in several directions so that the music can be heard effectively while the apparatus 12 is being held in any orientation. Every side of the apparatus 12 has small holes (which are shaped as musical notes in the preferred embodiment) around the perimeter, which allow the sound to escape to allow the music to be heard in any direction and to reduce the echo that may result from the sound waves bouncing off the inner walls of the cube.

The control system for apparatus 10, which is also preferably located within the housing 12, includes a central processing unit or CPU 30, which is preferably an integrated circuit type processor, and a memory unit, which is preferably a read-only memory chip or ROM 32. ROM 32 is preferably fixed within the apparatus 10, although it alternative could be made removable and replaceable, such as by sliding a card module into the apparatus 10. This would permit a consumer to change the musical options, such as songs and arrangements, that are available for use with the apparatus 10.

As is schematically illustrated in FIG. 3, the six buttons 20 are respectively associated with six switches, S1, S2, S3, S4, S5 and S6, and these switches are in communication with the CPU 30 so that the CPU 30 will be able to sense when a particular button 20 has been depressed by a user. Likewise, the six illumination sources 34 that are associated with the six respective buttons 20 are in communication with CPU 30 so as to be controllable by the CPU 30. In addition, CPU 30 is in communication with the speaker 28.

According to one important aspect of the invention, stored on ROM 32 is at least one multi-channel musical composition. For the purpose of this document, a "channel" is defined as a discrete electronic audio path or source. In the preferred embodiment, ROM 32 has stored thereon in digital electronic format eight different compositions, with each composition being made of six channels, each of which corresponds to a different musical instrument or group of instruments or a component of an instrument. In the most preferred embodiment, ROM 32 will include two commercially available 4-channel chips, which will provide the eight channel capability, with three channels being dedicated to the piano, two channels being dedicated to the harp, and one channel each being dedicated to the flute, French horn and violin. By dedicating more than one channel to the piano and harp, the apparatus 12 can better simulate play of these instruments, wherein it is common for two or more notes to be produced at the same time.

It should be noted that in the preferred embodiment the selected channels represent at least one instrument from each of the four major classes, these being brass (the French horn), woodwind (the flute), percussion (the piano), and string (the violin and harp). For example, if the composition is *Twinkle, Twinkle Little Star*, there will be stored for this particular composition separate three distinct channels for a piano accompaniment for the composition, two channels of harp accompaniment, a violin accompaniment, a flute accompaniment, and a French horn accompaniment.

The type of music that is best suited to teaching basic concepts of music is implemented in the apparatus. The key characteristics of this type of music, which is defined for purposes of this document as "developmentally appropriate music" are:

(a) tonal major music, i.e., constructed in a major key according to the accepted conventions of Western tonal music, including a major triad consisting of the "tonic," "mediant" and "dominant;"

(b) simple melodic, i.e., consisting of a prominent sequence of notes that can be recognized and remembered by infants and also sung or hummed by adults;

(c) musical material that has elements of repetition of either melody, rhythm or both, thus promoting anticipation and recognition;

(d) tempo that is not very fast (e.g., "allegro" but not "presto"), so that the child is able to perceive the sequence of individual notes or phrases (e) duration that provides a musically complete set of related phrases within the general span of attention of an infant or young child. Accordingly, each composition, and therefore each channel is preferably about 5 seconds to five minutes in length, and is most preferably from about fifteen seconds to one minute in length.

Preferably, each channel is a high quality digital recording of an actual instrument being played, or is modified from a synthesized note to simulate the actual sound of the instrument as opposed to being a simple note synthesis. As a result, when more than one or all of the channels are played together, the net effect is of an orchestra playing, with each of the different instruments being distinguishable by listeners.

CPU 32 is preferably programmed to ensure that any channel or instrument may be silenced or started at any time as the composition is being played by pressing the button that corresponds to that channel or instrument. CPU 32 further ensures that when more than one channel or instrument is being played at a time, the different are time-synchronized together as intended in the overall orchestral arrangement of the composition. This allows the user to add and subtract channels or instruments while the composition is playing without missing a note, providing fluid, seamless arrangements.

In operation, each button corresponding to an instrument will light up so as to blink in synchronization with notes being played by that instrument for as long as that instrument is included in the ensemble that is playing. If another button is pressed in the midst of a performance when the instrument corresponding to that button is not playing, the channel that corresponds to the second button will begin to play in synchronization to the first channel, and the button will begin to blink in synchronization with the notes that are being played with that instrument. Additional channels may be added in this matter. If a button is pushed for a second time during the performance of this composition, this will instruct the CPU 32 to subtract the corresponding channel or instrument from the composition as it plays, and the button will no longer be lit after the channel or instrument ceases. If all of the instruments are subtracted, the sequence of the song will continue, as will be indicated by the lit orchestral button, and any one of the instruments may be brought back into play by pressing the appropriate button.

If the button depicting the orchestra is depressed when no song is playing, the CPU 32 is programmed to begin playing the full orchestral channel for that same song. If, however, the orchestra button is pushed while a song is in the process of playing, the CPU 30 will switch to another composition.

This new composition will be the default composition in the event that any of the buttons are pushed to initiate the apparatus 10 to play a song.

The apparatus 12 is further programmed to shut off automatically after a predetermined period of time to conserve power.

The following table depicts an illustrative play pattern that is just one of an almost infinite amount of different ways of how the apparatus 10 may be operated by pushing different buttons:

| Action No. | Button Depressed | Result |
| --- | --- | --- |
| 1 | Piano | Piano begins composition #1 |
| 2 | Flute | Flute begins to accompany Piano in mid-song for composition #1. |
| 3 | Violin | Violin begins to accompany Piano and Flute for composition #1. |
| 4 | Harp | Harp begins to accompany Violin, Piano and Flute for composition #1. |
| 5 | Violin | Violin drops out, Harp, Piano and Flute continue to play composition #1. (Composition #1 is permitted to conclude.) |
| 6 | Orchestra | The full orchestral channel for composition #1 is played. |
| 7 | Orchestra | Composition #1 is stopped and the full orchestral channel for composition #2 starts from the beginning. |
| 8 | Harp | Full Orchestra drops out; Violin, Piano, Flute and French Horn continue to play composition #2 together. |
| 9 | Violin | Violin drops out, Piano, Flute and French Horn continue to play composition #2 together. |
| 10 | Piano | Piano drops out, Flute and French Horn continue to play composition #2 together. |
| 12 | Flute | Flute drops out, French Horn continues to play composition #2. |
| 13 | French Horn | Composition #2 stops playing. |
| 14 | Harp | Harp begins to play Composition #2. |
| 15 | Orchestra | Composition #2 stops playing; the full orchestral channel for composition #3 begins playing. |
| 16 | Orchestra | Composition #3 stops playing; the full orchestral channel for composition #4 begins playing. |
| 17 | Orchestra | Composition #4 stops playing; the full orchestral channel for composition #5 begins playing. |

As is demonstrated in the example give above, any instrument can be repeatedly added subtracted from the ensemble, either consecutively or in interdigitation with the addition or subtraction of any other instrument, numerous times during the presentation of any composition. Through use of the apparatus 10 as described above, the child can create his or her own orchestra by mixing up to five instruments, and, by pressing the ORCHESTRA button, play a composition by a full orchestra. Through this, the child is also made aware of such concepts as melodic and harmonic role in ensemble music.

Accordingly, the invention and the preferred embodiment described herein permits an infant or small child to experience complex, polyphonic music from a quality source in a way that maximizes the child's opportunity to learn from and develop in response to the music. It further permits the infant or small child to experiment or improvise with respect to the music, but not in a discordant way, only in a way that will enhance the learning and development process. This entire experience will be afforded to the infant or small child in an apparatus that is visually attractive and safe, so that it may be used even when a parent or caregiver is not closely watching. Moreover, though the use of the illumination of the buttons as the corresponding channels are being played, the infant or small child begins to associate each instrument or the entire orchestra with the appropriate sound.

The apparatus 12 could be used to teach any kind of music, such as classical music, lullabies, rock, country, or various kinds of international music, and the channels and instruments represented thereby could be selected as necessitated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for facilitating an understanding and recognition of ensemble music in infants and small children, comprising:

a housing;

a speaker positioned within said housing;

a plurality of input devices positioned on said housing, said apparatus being constructed so as not to include a keyboard for entering individual sounds; and music generating means within said housing for storing and playing at least one developmentally appropriate prearranged multi-channel musical composition, said music generating means being electronically connected to said speaker and said input devices, and wherein said music generating means is constructed and arranged to be able to, in response to actuation of at least one of said input devices by a user, change the identity of channels of the multi-channel composition that are being played without interrupting the musical composition as it plays, said channels being arranged so as to permit a small child to conduct limited experimentation and improvisation within developmentally appropriate limits with respect to the musical composition, but to preclude discordant sounds that will not enhance the learning and development process.

2. An apparatus according to claim 1, wherein said musical generating means is constructed and arranged to be able to, in response to actuation of at least one of said input devices by a user, add at least one channel of the multi-channel composition as it plays.

3. An apparatus according to claim 1, wherein said musical generating means is constructed and arranged to be able to, in response to actuation of at least one of said input devices by a user, subtract at least one channel of the multi-channel composition as it plays.

4. An apparatus according to claim 1, wherein at least one of said channels in said multi-channel composition is dedicated to a single musical instrument.

5. An apparatus according to claim 4, wherein said musical generating means is constructed and arranged to be able to, in response to actuation of at least one of said input devices by a user, add at least one channel of the multi-channel composition that is dedicated to a single musical instrument as it plays.

6. An apparatus according to claim 4, wherein said musical generating means is constructed and arranged to be able to, in response to actuation of at least one of said input devices by a user, subtract at least one channel of the multi-channel composition that is dedicated to a single musical instrument as it plays.

7. An apparatus according to claim 4, wherein at least one of said channels in said multi-channel composition is dedicated to a single string-section type musical instrument.

8. An apparatus according to claim 4, wherein at least one of said channels in said multi-channel composition is dedicated to a single woodwind-section type musical instrument.

9. An apparatus according to claim 4, wherein at least one of said channels in said multi-channel composition is dedicated to a single brass-section type musical instrument.

10. An apparatus according to claim 4, wherein at least one of said channels in said multi-channel composition is dedicated to a single percussion-section type musical instrument.

11. An apparatus according to claim 1, wherein said housing is fabricated without sharp edges, whereby it is safe for infants and small children to possess.

12. An apparatus according to claim 1, wherein s aid musical generating means is constructed and arranged to be able to, in response to actuation of at least one of said input devices by a user while music is playing begin playing a different musical composition, and when pushed when no music is playing, to begin playing the same musical composition.

13. An apparatus according to claim 1, wherein said housing is shaped as a polyhedron.

14. An apparatus according to claim 11, wherein said housing is shaped substantially as a cube having six sides.

15. An apparatus according to claim 14, wherein said input devices are located on respective sides of said cube-shaped housing.

16. An apparatus according to claim 15, wherein said input devices comprise buttons that are constructed and arranged to be pushed by an infant or small child.

17. An apparatus according to claim 1, wherein said input devices are constructed and arranged to be actuated by an infant or small child.

18. An apparatus according to claim 17, further comprising visual indicia associated with at least one input device for indicating the identity of a channel that is to be changed by that input device.

19. An apparatus according to claim 18, wherein said visual indicia comprises a graphic that represents a musical instrument.

20. An apparatus according to claim 1, wherein said musical generating means is constructed and arranged to be able to, in response to first actuation of at least one of said input devices by a user, add at least one channel of the multi-channel composition as it play, and, in response to a second actuation of at least one of said input devices by a user, subtract at least one channel of the multi-channel composition as it plays.

21. An apparatus according to claim 20, further comprising an indicating means associated with at least one of the input devices for indicating whether a channel of the multi-channel composition that is associated with that input device is presently active or inactive.

22. An apparatus according to claim 21, wherein said indicating means comprises a light.

23. An apparatus according to claim 1, wherein said music generating means is constructed and arranged to store and play more than one prearranged multi-channel musical composition, and is further constructed and arranged to change to a new musical composition when one of said input devices is actuated.

24. A method for teaching musical concepts to infants and small children, comprising steps of:
(a) providing a child-friendly apparatus that does not include a keyboard for entering individual sounds and that is capable of playing a developmentally appropriate orchestral composition that includes a plurality of different musical instruments;

(b) actuating the apparatus to play the composition; and
(c) modifying within a controlled number of developmentally appropriate possibilities the number of instruments that are playing as the composition plays while precluding discordant, non developmentally appropriate sound combinations that will not enhance the learning and development process, whereby the infant or small child is made aware of the effect of the presence or absence of different instruments in the overall composition.

25. A method according to claim 24, wherein step (c) comprises subtracting at least one instrument from the orchestral composition as it plays.

26. A method according to claim 24, wherein step (c) comprises adding at least one instrument to the orchestral composition as it plays.

27. A method according to claim 24, wherein step (c) comprises repeatedly adding and subtracting at least one instrument to the composition as it plays.

28. A method according to claim 24, further comprising a step of providing a visual indication of whether a particular instrument is in play.

29. A method according to claim 28, wherein said step of providing a visual indication of whether a particular instrument is in play comprises providing a light that is associated with an image of the particular instrument.

30. A method according to claim 29, wherein said step of providing a visual indication of whether a particular instrument further comprises modifying the light according to when the instrument is actually playing a note.

31. A method according to claim 24, wherein step (c) is performed by actuating an input device on the apparatus that is associated with a particular instrument.

32. A method according to claim 31, further comprising a step of relying on visual indicia associated with an input device to determine which instrument is being affected by actuating the input device.

33. A method according to claim 31, wherein step (c) is performed by actuating said input device a first time to subtract a particular instrument, and actuating the same input device a second time to add the same instrument.

34. A method according to claim 24, wherein steps (b) and (c) are performed by the infant or small child.

35. A method according to claim 24, wherein steps (b) and (c) are performed by a caregiver.

36. A method according to claim 24, further comprising a step of actuating the apparatus to play a second orchestral composition that includes a plurality of different musical instruments.

37. A method according to claim 24, wherein step (c) further comprises modifying the number of instruments that are playing as the composition plays.

38. A method according to claim 24, wherein step (c) is further performed so as to make the infant or small child aware of the effect of the presence or absence of a melodic role.

39. A method according to claim 24, wherein step (c) is further performed so as to make the infant or small child aware of the effect of the presence or absence of a harmonic role.

40. A method for teaching musical concepts to infants and small children, comprising steps of:
(a) providing a child-friendly apparatus does not include a keyboard for entering individual sounds and that is capable of playing developmentally appropriate orchestral composition that includes a plurality of different musical instruments;

(b) playing a first developmentally appropriate composition with the apparatus;

(c) modifying within a controlled number of developmentally appropriate possibilities the number of instruments that are playing as the composition plays while precluding discordant, non developmentally appropriate sound combinations that will not enhance learning and development, said step of modifying being performed by manipulating at least one input device on the apparatus, whereby the infant or small child is made aware of the effect of the presence or absence of different instruments in the overall composition; and (d) playing a second developmentally appropriate composition with the apparatus by manipulating another input device on the apparatus.

41. A method according to claim 40, wherein at least said one input device comprises a button that is marked with a graphic indicating an individual musical instrument.

42. A method according to claim 40, wherein at least said another input device comprises a button that is marked with a graphic indicating an ensemble of instruments.

43. A method according to claim 40, wherein comprising a step of modifying the number of instruments that are playing as the second composition plays by manipulating said at least one input device on the apparatus.

44. An apparatus according to claim 1, wherein said housing is shaped as a polyhedron having a plurality of outer surfaces, and wherein said input devices are located on more than one of said outer surfaces.

45. An apparatus according to claim 44, wherein said input devices each comprise a button that is constructed and arranged to be depressed by an infant or small child, said button having a surface area that is at least 4 cm$^2$.

46. An apparatus according to claim 45, wherein said button has a surface area that is at least 9 cm$^2$.

47. A method according to claim 24, wherein step (c) is performed by actuating a single input device that corresponds to a particular musical instrument.

48. A method according to claim 47, wherein said input device comprises a button that is constructed and arranged to be depressed by an infant or small child, said button having a surface area that is at least 4 cm$^2$.

49. A method according to claim 48, wherein said button has a surface area that is at least 9 cm$^2$.

50. A method according to claim 50, wherein step (c) is performed by actuating a single input device that corresponds to a particular musical instrument.

51. A method according to claim 50, wherein said input device comprises a button that is constructed and arranged to be depressed by an infant or small child, said button having a surface area that is at least 4 cm$^2$.

52. A method according to claim 51, wherein said button has a surface area that is at least 9 cm$^2$.

53. A method according to claim 40, wherein step (c) is performed by actuating a single input device that corresponds to a particular musical instrument.

54. A method according to claim 53, wherein said input device comprises a button that is constructed and arranged to be depressed by an infant or small child, said button having a surface area that is at least 4 cm$^2$.

55. A method according to claim 54, wherein said button has a surface area that is at least 9 cm$^2$.

56. An apparatus according to claim 44, wherein said input devices each comprise a button that is constructed and arranged to be depressed by an infant or small child, said button having a surface area that is at least 4 cm$^2$.

57. An apparatus according to claim 56, wherein said button has a surface area that is at least 9 cm$^2$.

58. An apparatus for teaching an infant or small child complex musical concepts in a controlled manner that permits limited improvisation within a controlled number of developmentally appropriate possibilities, comprising:

a housing having a size, shape and weight that permit it to be handled and lifted by a small child, said housing being fabricated without sharp edges so that it is safe for infants and small children to possess, said housing further having a number of input devices thereon that are shaped and sized so as to be actuatable by a small child;

a speaker positioned within said housing;

music generating means within said housing, electronically connected to said input devices and said speaker, for storing and playing at least one prearranged developmentally appropriate multi-channel symphonic musical composition, said music generating means being constructed and arranged so as to permit an infant or small child to play said full multi-channel symphonic musical composition and, by using said input devices, to add and subtract channels as the composition is playing, said music generating means and said channels being arranged so as to permit controlled experimentation and improvisation within a limited number of developmentally appropriate possibilities, but to preclude discordant sound combinations that are not developmentally appropriate and that will not enhance learning and development.

59. An apparatus according to claim 58, wherein said channels respectively comprise the sound of different musical instruments, and wherein said channels are arranged so that each of the different instruments are distinguishable to a listener when said full multi-channel symphonic musical composition is played.

60. An apparatus according to claim 59, wherein said input devices each comprise a button that is constructed and arranged to be depressed by an infant or small child, said button having a surface area that is at least 4 cm$^2$.

61. An apparatus according to claim 60, wherein said button has a surface area that is at least 9 cm$^2$.

62. An apparatus according to claim 58, further comprising a light associated with at least one of said input devices, said light being constructed and arranged to indicate when said channel that is associated with said input device is being played.

63. An apparatus according to claim 62, wherein said apparatus comprises a plurality of said lights, each of said lights being associated with a respected input device for indicating when a channel that is associated with said respective input device is being played.

\* \* \* \* \*